(12) United States Patent
Katou et al.

(10) Patent No.: US 9,897,825 B2
(45) Date of Patent: Feb. 20, 2018

(54) OPTICAL MODULATOR

(71) Applicant: SUMITOMO OSAKA CEMENT CO., LTD., Tokyo (JP)

(72) Inventors: Kei Katou, Tokyo (JP); Norikazu Miyazaki, Tokyo (JP); Ryo Shimizu, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/468,115

(22) Filed: Mar. 24, 2017

(65) Prior Publication Data

US 2017/0276972 A1    Sep. 28, 2017

(30) Foreign Application Priority Data

Mar. 25, 2016 (JP) .................. 2016-061200

(51) Int. Cl.
 *G02F 1/01* (2006.01)
 *G02F 1/03* (2006.01)
 *G02F 1/035* (2006.01)
(52) U.S. Cl.
 CPC ............ *G02F 1/0327* (2013.01); *G02F 1/035* (2013.01); *G02F 2201/07* (2013.01); *G02F 2201/58* (2013.01)
(58) Field of Classification Search
 CPC ...... G02F 1/225; G02F 2001/212; G02F 1/01; G02F 1/035; G02F 1/0327; G02B 6/12007
 See application file for complete search history.

(56) References Cited

U.S. PATENT DOCUMENTS

| 5,793,521 A | * | 8/1998 | O'Brien | .................. H01S 5/026 359/344 |
|---|---|---|---|---|
| 2009/0123162 A1 | * | 5/2009 | Tanaka | .................. H04B 10/58 398/183 |
| 2010/0054756 A1 | * | 3/2010 | Nishihara | .......... H04B 10/5051 398/185 |
| 2013/0284929 A1 | * | 10/2013 | Ouchi | .................. G02F 1/3511 250/339.01 |

FOREIGN PATENT DOCUMENTS

| JP | 2015-138145 | 7/2015 |
|---|---|---|
| JP | 2015-194517 | 11/2015 |
| JP | 2015-197451 | 11/2015 |

* cited by examiner

*Primary Examiner* — Jennifer Doan
(74) *Attorney, Agent, or Firm* — JCIPRNET

(57) ABSTRACT

An optical modulator includes a substrate having an electro-optic effect, an optical waveguide that is formed in the substrate, and a modulation electrode (not illustrated) for modulating a light wave that propagates through the optical waveguide. In the optical modulator, a light-receiving element is disposed on the substrate, and the light-receiving element includes a light-receiving section that receives a light wave that propagates through the optical waveguide, and the light-receiving section is located on the downstream side of a center of the light-receiving element in a light wave propagating direction.

5 Claims, 3 Drawing Sheets

OPTICAL MODULATOR

CROSS-REFERENCE TO RELATED APPLICATION

This application claims the priority benefit of Japan application serial no. 2016-061200, filed on Mar. 25, 2016. The entirety of the above-mentioned patent application is hereby incorporated by reference herein and made a part of this specification.

BACKGROUND OF THE INVENTION

Field of the Invention

The present invention relates to an optical modulator, and particularly, to an optical modulator including a substrate having an electro-optic effect, an optical waveguide that is formed in the substrate, and a modulation electrode for modulating a light wave that propagates through the optical waveguide.

Description of Related Art

In an optical communication field or an optical measurement field, various kinds of optical modulators such as an intensity modulator and a phase modulator, which includes a Mach-Zehnder type optical waveguide, have been used. An intensity variation of light, which is output from the Mach-Zehnder type optical waveguide, shows, for example, sinusoidal function characteristics with respect to a voltage that is applied to a modulation electrode. It is necessary to set a modulation signal, which is applied to the modulation electrode, to an appropriate operation bias point so as to obtain an optimal intensity of output light in accordance with a usage of the optical modulator.

According to this, in the related art, monitoring of an intensity state of output light of the optical modulator has been performed by detecting a part of an optical signal, which is output from the optical modulator, or radiated light that is radiated from a multiplexing section of the Mach-Zehnder type optical waveguide, as monitoring light with a light-receiving element such as an optical detector. In addition, an operation bias point of the modulation signal, which is applied to the modulation electrode, is adjusted (bias-controlled) on the basis of a detected value (monitoring output) of the light-receiving element.

With regard to the optical modulator as described above, various inventions have been suggested before now.

For example, Japanese Laid-open Patent Publication No. 2015-194517 discloses an optical modulator configured to suppress a decrease in a frequency band of a light-receiving element even in a case where two kinds of radiated light from the multiplexing section of the Mach-Zehnder type optical waveguide are simultaneously received and are monitored. In addition, Japanese Laid-open Patent Publication No. 2015-138145 discloses an optical modulator configured to enhance light-receiving sensitivity of the light-receiving element and to suppress a decrease in the frequency band of the light-receiving element even in a case where the light-receiving element is disposed on a substrate. In addition, Japanese Laid-open Patent Publication No. 2015-197451 discloses an optical modulator configured to minimize noise such as electrical crosstalk from being incorporated into a detected signal output from the light-receiving element.

SUMMARY OF THE INVENTION

Along with the high capacity required for communications in recent years, an optical modulator having a structure, in which a plurality of optical modulation sections are provided in one substrate and optical modulation is performed by applying a modulation signal different for each of the optical modulation sections to the modulation electrode, has been developed. In addition, a multi-element structure optical modulator, which includes a plurality of substrates respectively provided with a plurality of optical modulation sections, has also been developed. The optical modulator has a configuration in which a plurality of light-receiving elements are disposed in each of the substrates and monitoring light is detected for each of the optical modulation sections so as to independently perform a bias control for a modulation signal in each of optical modulation sections.

On the other hand, in accordance with a demand for a reduction in size of the optical modulator, a reduction in size of a substrate that constitutes the optical modulator is in progress. However, when disposing a plurality of light-receiving elements in the substrate, an increase in the substrate size is caused, and this increase becomes problematic in the progress of the reduction in size of the substrate. Accordingly, a reduction in size of the light-receiving element, which is disposed in the substrate, has been examined to reduce the size of the substrate.

The invention provides an optical modulator having a structure capable of reducing a substrate size through a reduction in size of the light-receiving element.

An optical modulator of the invention has the following technical characteristics.

(1) According to an aspect of the invention, there is provided an optical modulator including a substrate having an electro-optic effect, an optical waveguide that is formed in the substrate, a modulation electrode for modulating a light wave that propagates through the optical waveguide, and a light-receiving element that is disposed on the substrate. The light-receiving element includes a light-receiving section that receives a light wave that propagates through the optical waveguide, and the light-receiving section is located on the downstream side of a center of the light-receiving element in a light wave propagating direction.

(2) In the optical modulator according to (1), a width of waveguide of the optical waveguide may broaden at the light-receiving section.

(3) In the optical modulator according to (1) or (2), a length of the light-receiving element in the light wave propagating direction may be 50 µm to 800 µm.

(4) In the optical modulator according to any one of (1) to (3), a height of the light-receiving element may be 50 µm to 500 µm.

(5) In the optical modulator according to any one of (1) to (4), a buffer layer may be formed on a surface of the substrate, and the buffer layer may be excluded in a region in which the light wave propagating through the optical waveguide is guided toward the light-receiving section, or the buffer layer in the region may be made to be thinner in comparison to the buffer layer in the other regions.

An optical modulator according to the aspect of the invention includes a substrate having an electro-optic effect, an optical waveguide that is formed in the substrate, a modulation electrode for modulating a light wave that propagates through the optical waveguide, and a light-receiving element that is disposed on the substrate. The light-receiving element includes a light-receiving section, which receives a light wave that propagates through the optical waveguide, on the downstream side of a center of the light-receiving element in a light wave propagating direction. Accordingly, it is possible to reduce the size of the light-receiving element by shortening a length in a light wave propagating direction, and thus it is possible to realize a reduction in a substrate size of the optical modulator.

DETAILED DESCRIPTION OF THE INVENTION

Hereinafter, an optical modulator according to the invention will be described in detail.

Figure 1:
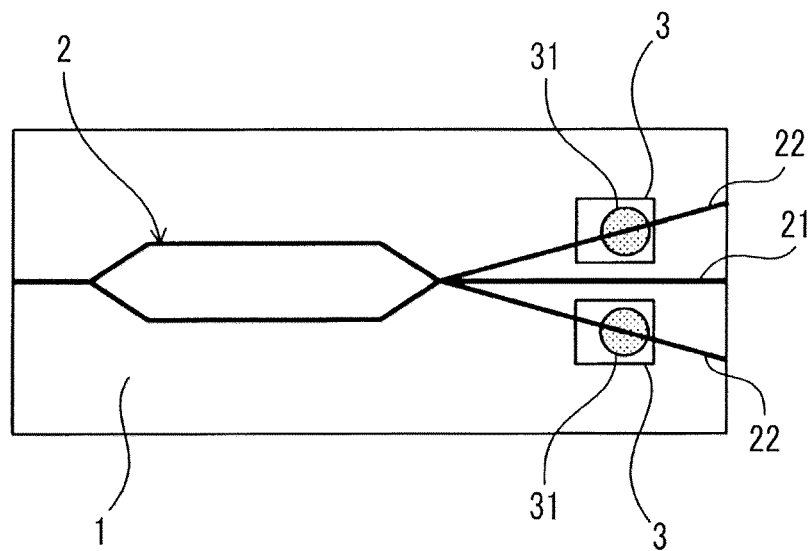
FIG. 1 is a plan view illustrating an optical modulator according to an example of the invention.
Figure 2:
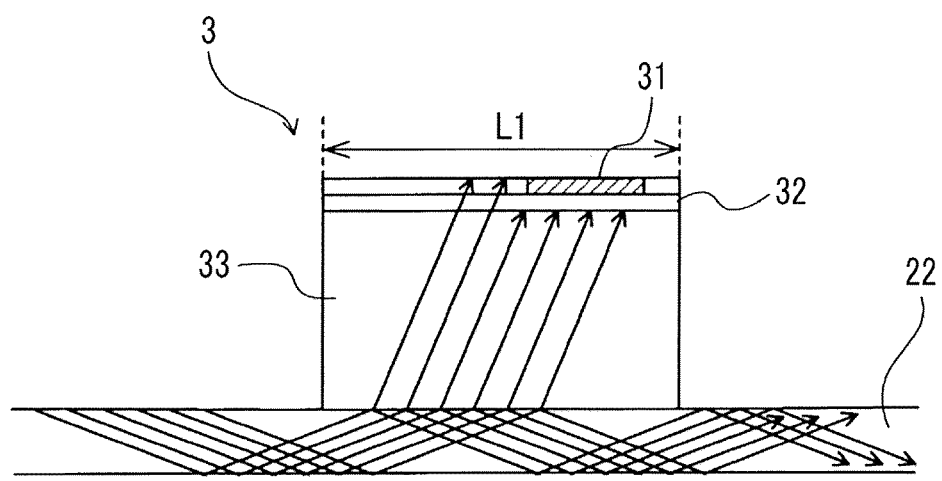
FIG. 2 is a cross-sectional view of the light-receiving element in FIG. 1 in a direction along a radiated-light waveguide.

FIG. 1 is a plan view illustrating an optical modulator according to an example of the invention. FIG. 2 is a cross-sectional view of a light-receiving element in FIG. 1 in a direction along a radiated-light waveguide.

As illustrated in FIG. 1 and FIG. 2, the optical modulator of the invention is an optical modulator including a substrate 1 having an electro-optic effect, an optical waveguide 2 that is formed in the substrate, and a modulation electrode (not illustrated) for modulating a light wave that propagates through the optical waveguide.

In the optical modulator, a light-receiving element 3 is disposed on the substrate 1, and the light-receiving element 3 includes a light-receiving section 31, which receives a light wave that propagates through the optical waveguide 2, on the downstream side of a center of the light-receiving element 3 in a light wave propagating direction.

Examples of the substrate 1 include a substrate such as quartz and a semiconductor in which an optical waveguide can be formed, and a substrate that has an electro-optic effect and uses anyone single crystal in lithium niobate ($LiNbO_3$), lithium tantalate ($LiTaO_3$), and lead lanthanum zirconate titanate (PLZT), and the like.

For example, the optical waveguide 2, which is formed in the substrate, is formed by thermally diffusing a high-refractive-index material such as titanium (Ti) on a $LiNbO_3$ substrate (LN substrate). In addition, it is possible to use a rib-type optical waveguide in which a groove is formed on both sides of a portion that becomes an optical waveguide, or a ridge-type waveguide in which an optical waveguide portion is formed in a convex shape. In addition, the invention is also applicable to an optical circuit in which an optical waveguide is formed in substrates such as PLCs different from each other, and the substrates are joined and integrated.

The modulation electrode is constituted by a signal electrode or a ground electrode, and is formed by a gold plating method in which an electrode pattern of Ti and Au is formed on a substrate surface, and the like. In addition, a buffer layer such as dielectric $SiO_2$ may be provided on the substrate surface after forming the optical waveguide as necessary.

Furthermore, when forming the buffer layer in a region that guides an optical signal, which propagates through the inside of the substrate 1 (optical waveguide 2), to a light-receiving element 3 side, it is difficult to effectively guide the optical signal. Accordingly, it is preferable not to form the buffer layer in the region.

Figure 6:
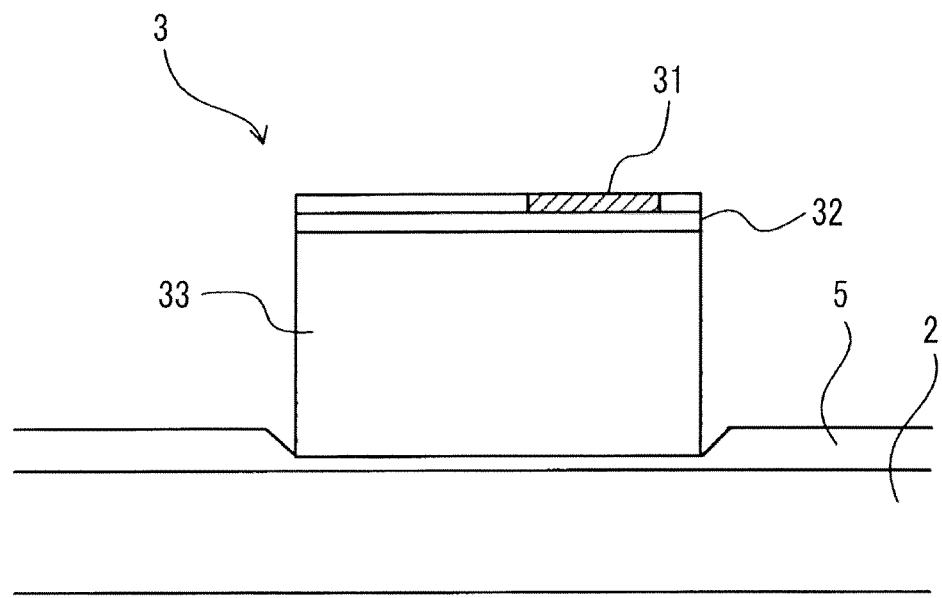
FIG. 6 is a cross-sectional view illustrating an example in which a buffer layer in a region, in which the light-receiving element is disposed, is made to be thin.

In addition, as illustrated in FIG. 6, in a case of disposing the light-receiving element 3 through the buffer layer 5, it is preferable that the thickness of the buffer layer 5 in the region in which the light-receiving element 3 is disposed is made to be smaller than the thickness of other regions so as to secure light-receiving sensitivity. Exclusion or thinning of the buffer layer may not be carried out with respect to the entirety of a region in which the light-receiving element 3 is disposed, and may be carried out at least in a region in which an optical signal is guided toward a light-receiving section 31 of the light-receiving element 3, that is, in a region on an upstream side in a light wave propagating direction.

Light-receiving elements 3 may be brought into direct contact with the optical waveguide 2, but it is preferable that to form a high-refractive-index film on the optical waveguide 2 and to dispose the light-receiving elements 3 on the high-refractive-index film so as to effectively extract light (evanescent wave) that is radiated from the optical waveguide 2. In this case, it is necessary to set a refractive index of the high-refractive-index film to be higher than a refractive index of the optical waveguide 2 and lower than a refractive index of a light-receiving element substrate.

The optical waveguide 2 has a Mach-Zehnder type waveguide structure and as a configuration in which an input waveguide is diverged into two parts, and two diverged waveguides are coupled and are connected to an output waveguide 21. Furthermore, the optical waveguide 2 is not limited to an optical waveguide configuration with one Mach-Zehnder type optical waveguide as illustrated in FIG. 1. That is, for example, it is possible to use optical waveguides having various shapes such as an optical waveguide formed as a nest-type optical waveguide in which two Mach-Zehnder type optical waveguides are disposed in a nest shape, and an optical waveguide in which two nest-type optical waveguides are additionally disposed in a nest shape.

The light-receiving element 3, which receives a light wave that propagates through the optical waveguide 2, is disposed on a surface of the substrate 1. In this example, as the substrate 1, a substrate having a thickness of 20 μm or less is used, but the thickness of the substrate is arbitrarily set.

The light-receiving element 3 detects apart of an optical signal that propagates through the output waveguide 21 and is output from the optical modulator, or radiated light that is radiated from a multiplexing section of the Mach-Zehnder type optical waveguide as monitoring light. In the example illustrated in FIG. 1, the light-receiving element 3, which detects radiated light that is radiated from a multiplexing section of the Mach-Zehnder type optical waveguide as monitoring light, is provided on both sides of the output waveguide 21 one by one.

As illustrated in FIG. 1, it is preferable to form a radiated-light waveguide 22 that guides radiated light so as to effectively guide the radiated light, which is detected as the monitoring light, to the light-receiving element 3. According to this, it is possible to easily adjust a propagation optical path of the radiated light, and thus it is possible to more optimally set a positional relationship with the light-receiving element 3, or a positional relationship with the output waveguide 21.

Furthermore, the output waveguide 21 may be provided straddling the light-receiving element to receive two kinds of radiated light, which are radiated from the multiplexing section of the Mach-Zehnder type optical waveguide, with one light-receiving element. In this case, two light-receiving sections may be provided in correspondence with the two kinds of radiated light, and the two kinds of radiated light may be received with one light-receiving section.

As illustrated in FIG. 1 and FIG. 2, the optical modulator of the invention has the following characteristics. That is, the light-receiving element 3 includes the light-receiving section 31, which receives a light wave (monitoring light) that propagates through the optical waveguide 2, on the downstream side of a center of the light-receiving element 3 in a light wave propagating direction.

As the light-receiving element 3, a photo-diode (PD) can be appropriately used. In FIG. 2, a light-receiving layer 32 formed from InGaAs or GaAs is provided on an upper side of a light-receiving element substrate 33 formed from InP or GaAs, and the light-receiving section 31 is provided to come into contact with the light-receiving layer 32. In addition, the light-receiving element substrate 33 has a refractive index higher than a refractive index of the radiated-light waveguide 22, and is provided to come into contact with the radiated-light waveguide 22. Accordingly, radiated light, which propagates through the radiated-light waveguide 22, is taken up toward the light-receiving section 31.

Here, for example, when the refractive index of the light-receiving element substrate 33 is set to 3.16, and an effective refractive index of the radiated-light waveguide 22 is set to 2.15, a radiation angle of a light wave is set to a direction that deviates from the normal line of the waveguide substrate 1 by approximately 43°. FIG. 2 illustrates an aspect in which a part of a light wave (arrow) propagating through the radiated-light waveguide 22 is incident into the light-receiving element substrate 33.

With regard to an arrangement position of the light-receiving section 31 with respect to the light-receiving element 3, it is preferable that the light-receiving section 31 is disposed immediately over the radiated-light waveguide 22 when seen from a waveguide cross-section direction. The reason for this is that light (evanescent wave), which is radiated from the radiated-light waveguide 22 into the light-receiving element substrate 33, is radiated in the normal direction of the waveguide substrate 1, and a radiation angle is symmetric to the normal line.

On the other hand, with regard to an arrangement position of the light-receiving section 31 with respect to the light-receiving element 3, it is preferable that the light-receiving section 31 is provided on the downstream side of the center of the light-receiving element 3 in the light wave propagating direction. The reason for this is that a light wave, which is incident to a lower surface of the light-receiving element substrate 33, propagates in a direction inclined to the normal line of the waveguide substrate 1 (in the example, approximately 43°), and reaches an upper surface (light-receiving layer 32) of the light-receiving element substrate 33 at a position that deviates toward a downstream side from a position immediately over an incidence position. Accordingly, when the light-receiving section 31 is disposed on the upper surface of the light-receiving element substrate 33 so as to receive the light wave that is incident to an upstream side of the lower surface of the light-receiving element substrate 33, a light-receiving element portion on the downstream side of the light-receiving section 31 is not necessary. As described above, when the light-receiving section 31 is disposed on the downstream side of the center of the light-receiving element 3 in the light wave propagating direction, it is possible to realize a structure in which a width of the light-receiving element 3 in the light wave propagating direction is further shortened in comparison to the related art. However, this structure is not applied when considering multiplexing reflection at the inside of the light-receiving element substrate 33.

Furthermore, disposition of the light-receiving section 31 on a downstream side of the center of the light-receiving element 3 to a certain extent may be determined in accordance with a propagation angle of the light wave at the inside of the light-receiving element substrate 33 (a relationship between the refractive index of the light-receiving element substrate 33 and the effective refractive index of the radiated-light waveguide 22), or the height (thickness) of the light-receiving element substrate 33.

A width of the light-receiving section 31 can be arbitrarily set. However, with respect to a waveguide cross-section direction, the width may be set to an approximately beam width of the light wave that is received by the light-receiving section 31. For example, when a wavelength of the light wave is set to 1.55 μm, a mode diameter of the radiated-light waveguide 22 is set to 10 μm, and the height of the light-receiving element substrate 33 is set to 150 μm, the beam width in the light-receiving section 31 may be approximately 20 μm under the above-described refraction conditions. However, it is preferable that the width of the light-receiving section 31 is approximately 40 to 80 μm when considering a mounting position tolerance of the light-receiving element 3.

On the other hand, with regard to the light wave propagating direction, the monitoring light becomes parallel beams having approximately the same intensity, and thus there is no particular limitation to the width of the light-receiving section 31, but it is preferable to employ a width for realization of a rectangular or circular light-receiving section 31 when considering manufacturing easiness of a PD.

It is preferable that the light-receiving element 3 is made to be as small as possible, but it is necessary for the light-receiving element 3 to have a size capable of attaining required light-receiving sensitivity. In consideration of the necessity, it is preferable that the length of the light-receiving element 3 in the light wave propagating direction is, for example, 50 μm to 800 μm. In addition, it is preferable that the height of the light-receiving element 3 is, for example, 50 μm to 500 μm.

Figure 3:
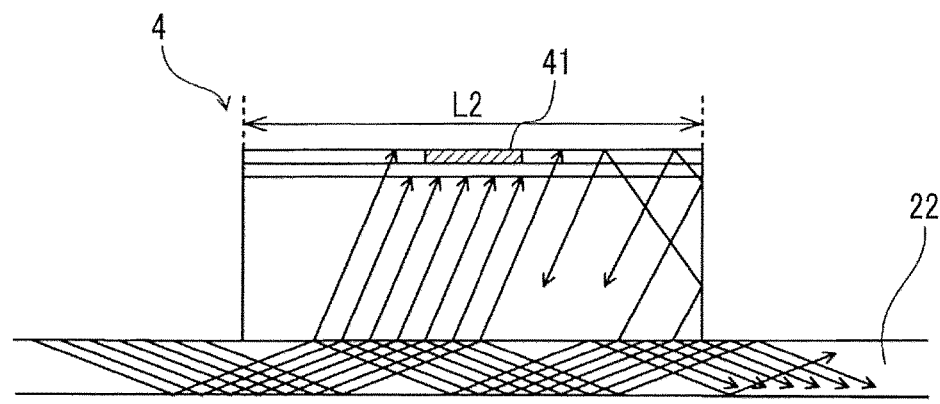
FIG. 3 is a cross-sectional view of a light-receiving element of the related art in a direction along a radiated-light waveguide.

The size of the light-receiving element according to the invention and the size of a light-receiving element of the related art will be compared with each other. As an example of the light-receiving element of the related art, FIG. 3 illustrates a light-receiving element 4 in which a light-receiving section 41 is provided at an approximately central position with respect to the light wave propagating direction. As will be clear from comparison between FIG. 2 and FIG. 3, a length L1 of the light-receiving element 3 according to the invention in the light wave propagating direction is set to be shorter than a length L2 of the light-receiving element 4 of the related art in the light wave propagating direction. As described above, when the light-receiving section 31 is provided on the downstream side of the center of the light-receiving element 3 in the light wave propagating direction, the length of the light-receiving element 3 in the light wave propagating direction is shortened, and thus it is possible to realize a reduction in size of the light-receiving element 3.

Figure 4:
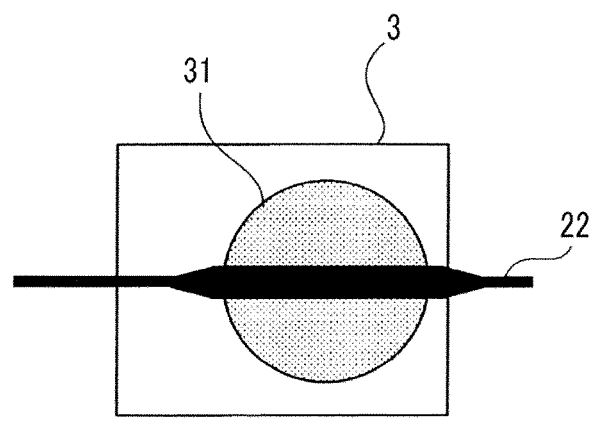
FIG. 4 is an enlarged plan view of the light-receiving element in FIG. 1.

Here, it is preferable that the radiated-light waveguide 22 has a structure in which a waveguide width broadens at a portion of the light-receiving section 31, as illustrated in FIG. 4. According to this, even when an area of the light-receiving section 31 is set to be smaller for a reduction in size of the light-receiving element 3, monitoring light, which propagates through the radiated-light waveguide 22, can be effectively taken into the light-receiving element 3 to be received by the light-receiving section 31.

Furthermore, hereinbefore, description has been given of a configuration in which the light-receiving element 3 is provided in the radiated-light waveguide 22 through which radiated light that is radiated from the multiplexing section of the Mach-Zehnder type optical waveguide propagates, and the radiated light is received as monitoring light, but there is no limitation thereto. That is, for example, it is possible to employ a structure in which a monitoring waveguide, which extracts a part of an optical signal propagating through the output waveguide 21, is provided, and the light-receiving element 3 is disposed with respect to the monitoring waveguide. In this case, a part of the optical signal, which propagates through the output waveguide 21, may be detected as monitoring light.

Figure 5:
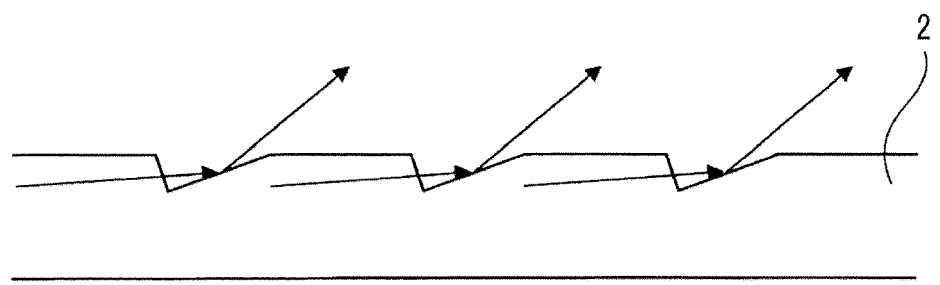
FIG. 5 is a cross-sectional view illustrating an example of extracting a light wave through reflection from an optical waveguide.

In addition, instead of the configuration in which the light (evanescent wave) radiated from the optical waveguide 2 is received by the light-receiving element 3 as described above, it is possible to employ a configuration in which the light wave propagating through the optical waveguide 2 can be extracted in a direction that is inclined with respect to the light wave propagating direction rather than a position immediately over the optical waveguide 2. That is, for example, as disclosed in Japanese Laid-open Patent Publication No. 2013-80009, it is possible to employ a configuration in which a groove or a reflective member is disposed in the substrate 1 (the optical waveguide 2 and the like) to guide a part of the light wave toward the light-receiving element 3 through reflection. At this time, as illustrated in FIG. 5, application of the invention is effective as long as the groove or the reflective member is disposed at an angle capable of reflecting the light wave in a direction that is inclined with respect to the light wave propagating direction rather than a position immediately over the optical waveguide 2. In addition, it is also possible to employ a configuration in which both of the evanescent wave and the reflected light are extracted and received by the light-receiving element 3. According to this configuration, it is possible to effectively enhance sensitivity of the light-receiving element 3. In addition, it is also possible to employ a configuration in which the light-receiving element 3 is disposed to overlap the output waveguide 21, and the groove or the reflective member is provided on a part of a cross-section of the output waveguide 21. In this case, a part of an optical signal, which propagates through the output waveguide 21, is extracted through reflection and is received by the light-receiving element 3.

Here, description has been given of an optical modulator in which a plurality of optical modulation sections are provided in one sheet of substrate as an example, but the invention is also applicable to a multi-element structure optical modulator including a plurality of substrates in which a plurality of optical modulation sections are provided. In addition, the invention is also applicable to a configuration in which light waves having wavelengths different from each other are optically modulated in the plurality of optical modulation sections.

In addition, as the optical modulation sections, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape. In this case, the light-receiving element may be provided for not only a main modulation section that is constituted by a Mach-Zehnder type optical waveguide on an outer side but also a sub-modulation section that is constituted by a Mach-Zehnder type optical waveguide on an inner side.

Hereinbefore, the invention has been described on the basis of examples. However, the invention is not limited to the above description, and it is needless to say that appropriate design modifications can be made in a range not departing from the gist of the invention.

As described above, according to the invention, it is possible to provide an optical modulator having a configuration capable of reducing a substrate size through a reduction in size of a light-receiving element.

What is claimed is:
1. An optical modulator, comprising:
a substrate having an electro-optic effect;
an optical waveguide that is formed in the substrate;
a modulation electrode for modulating a light wave that propagates through the optical waveguide; and
a light-receiving element that is disposed on the substrate,
wherein the light-receiving element includes a light-receiving section that receives a light wave that propagates through the optical waveguide, and a center of the light-receiving section is located on the downstream side with respect to a center of the light-receiving element in a light wave propagating direction.
2. The optical modulator according to claim 1,
wherein a width of waveguide of the optical waveguide broadens at the light-receiving section.
3. The optical modulator according to claim 1,
wherein a length of the light-receiving element in the light wave propagating direction is 50 μm to 800 μm.
4. The optical modulator according to claim 1,
wherein a height of the light-receiving element is 50 μm to 500 μm.
5. The optical modulator according to claim 1,
wherein a buffer layer is formed on a surface of the substrate, and
the buffer layer is excluded in a region in which the light wave propagating through the optical waveguide is guided toward the light-receiving section, or the buffer layer in the region is made to be thinner in comparison to the buffer layer in the other regions.

* * * * *